United States Patent
Lin et al.

(10) Patent No.: US 9,898,828 B2
(45) Date of Patent: Feb. 20, 2018

(54) METHODS AND SYSTEMS FOR DETERMINING FRAMES AND PHOTO COMPOSITION WITHIN MULTIPLE FRAMES

(71) Applicant: HTC Corporation, Taoyuan (TW)

(72) Inventors: Bing-Sheng Lin, Taoyuan (TW); Yi-Chi Lin, Taoyuan (TW); Tai-Ling Lu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 15/159,825

(22) Filed: May 20, 2016

(65) Prior Publication Data

US 2016/0267680 A1 Sep. 15, 2016

Related U.S. Application Data

(62) Division of application No. 14/220,149, filed on Mar. 20, 2014, now abandoned.

(51) Int. Cl.
*H04N 5/228* (2006.01)
*G06T 7/20* (2017.01)
(Continued)

(52) U.S. Cl.
CPC .......... *G06T 7/2053* (2013.01); *G06F 3/0488* (2013.01); *G06F 3/04845* (2013.01);
(Continued)

(58) Field of Classification Search
None
See application file for complete search history.

(56) References Cited

U.S. PATENT DOCUMENTS 6,659,344 B2  12/2003  Otto et al.
8,564,614 B2 * 10/2013  Muraki ................. G09G 5/393
                                                345/619
(Continued)

FOREIGN PATENT DOCUMENTS

CN    101421759 A    4/2009
CN    101998058 A    3/2011
(Continued)

OTHER PUBLICATIONS

Author: Jacques, J.C.S. et al. Title: Background Subtraction and Shadow Detection in Grayscale Video Sequences Date: 2005 Published in: Computer Graphics and Image Processing, 2005. SIBGRAPI 2005. 1 8th Brazilian Symposium.
(Continued)

*Primary Examiner* — Twyler Haskins
*Assistant Examiner* — Wesley Chiu
(74) *Attorney, Agent, or Firm* — CKC & Partners Co., Ltd.

(57) ABSTRACT

Methods and systems for determining frames and photo composition within multiple frames are provided. First, a plurality of frames, which are respectively captured with a predefined time interval are obtained. At least one object within at least two of the frames is detected. In some embodiments, a moving speed of the object is calculated according to the positions of the object in the respective frames and the predefined time interval, and candidate frames are selected from the frames according to the moving speed of the object. In some embodiments, an overlapped area corresponding to the object within a first frame and a second frame is calculated, and at least one candidate frame is selected according to the overlapped area corresponding to the object. The at least one candidate frame is composed to generate a composed photo.

7 Claims, 8 Drawing Sheets

(51) Int. Cl.
     *H04N 5/235*      (2006.01)
     *G06F 3/0488*     (2013.01)
     *G06F 3/0484*     (2013.01)
     *H04N 5/262*      (2006.01)
     *H04N 5/91*       (2006.01)
     *G06T 7/174*      (2017.01)
     *G06T 7/254*      (2017.01)

(52) U.S. Cl.
     CPC .............. *G06T 7/174* (2017.01); *G06T 7/254*
         (2017.01); *H04N 5/2353* (2013.01); *H04N*
         *5/2621* (2013.01); *H04N 5/2625* (2013.01);
         *H04N 5/91* (2013.01); *G06T 2207/10016*
         (2013.01); *G06T 2207/20224* (2013.01)

(56)              References Cited

U.S. PATENT DOCUMENTS

| | | | |
|---|---|---|---|
| 2006/0078224 A1* | 4/2006 | Hirosawa | H04N 5/2353 |
| | | | 382/284 |
| 2009/0012595 A1 | 1/2009 | Seliktar et al. | |
| 2009/0201382 A1* | 8/2009 | Makino | H04N 5/2625 |
| | | | 348/220.1 |
| 2009/0208062 A1* | 8/2009 | Sorek | H04N 5/232 |
| | | | 382/107 |
| 2010/0157085 A1* | 6/2010 | Sasaki | H04N 5/232 |
| | | | 348/222.1 |
| 2010/0172641 A1* | 7/2010 | Sasaki | H04N 5/232 |
| | | | 396/265 |
| 2011/0043639 A1* | 2/2011 | Yokohata | H04N 5/232 |
| | | | 348/169 |
| 2011/0205397 A1 | 8/2011 | Hahn et al. | |
| 2012/0002112 A1* | 1/2012 | Huang | H04N 5/144 |
| | | | 348/579 |
| 2012/0242853 A1* | 9/2012 | Jasinski | H04N 5/23232 |
| | | | 348/222.1 |
| 2012/0257071 A1* | 10/2012 | Prentice | H04N 5/23238 |
| | | | 348/220.1 |

FOREIGN PATENT DOCUMENTS

TW          201001338 A      1/2010
TW          201140412 A      11/2011

OTHER PUBLICATIONS

Wang Liang-liang et al, "The research of Moving object detection algorithm in video images", College of physical science and technology, Southwest Jiaotong University, China Academic Journal Electronic Publishing House, 2010, pp. 147-149.
Corresponding Chinese office action dated Jul. 3, 2017.

* cited by examiner

FIG. 8

METHODS AND SYSTEMS FOR DETERMINING FRAMES AND PHOTO COMPOSITION WITHIN MULTIPLE FRAMES

RELATED APPLICATIONS

The present application is a Divisional Application of the U.S. application Ser. No. 14/220,149, filed Mar. 20, 2014.

BACKGROUND OF THE INVENTION

Field of the Invention

The disclosure relates generally to image frame management, and, more particularly to methods and systems for determining frames and photo composition within multiple frames.

Description of the Related Art

Recently, portable devices, such as handheld devices, have become more and more technically advanced and multifunctional. For example, a handheld device may have telecommunications capabilities, e-mail message capabilities, image capture capabilities, an advanced address book management system, a media playback system, and various other functions. Due to increased convenience and functions of the devices, these devices have become necessities of life.

Currently, a function called 'continuous shot' is provided on the portable devices. In the continuous shot mode, the image capture unit, such as a camera takes images immediately one after another in a short amount time. That is, when the continuous shot function is performed, a continuous image capture process is performed to continuously capture a plurality of images in sequence. Additionally, an inventive function called "dynamic continuous shot composition" may be also provided on the portable devices. The dynamic continuous shot composition is a way for image composition. In the dynamic continuous shot composition, a camera can be set on a tripod, and several images with the same scene are continuously captured by the camera. The moving object within the images are extracted and overlapped onto the last image, thus to present the dynamic effect of the track of the moving object. The overlap of the moving object onto the last image can be achieved by using an image composition algorithm. It is understood that, the image composition algorithm may be various and known in the art, and related descriptions are omitted here.

Figure 1A:
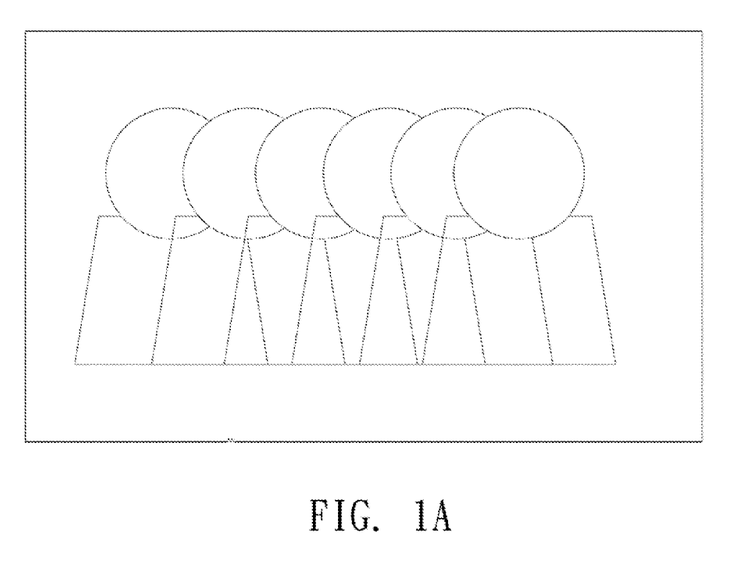
FIG. 1A is a schematic diagram illustrating an example of a composed image with objects having a large overlapped portion.
Figure 1B:
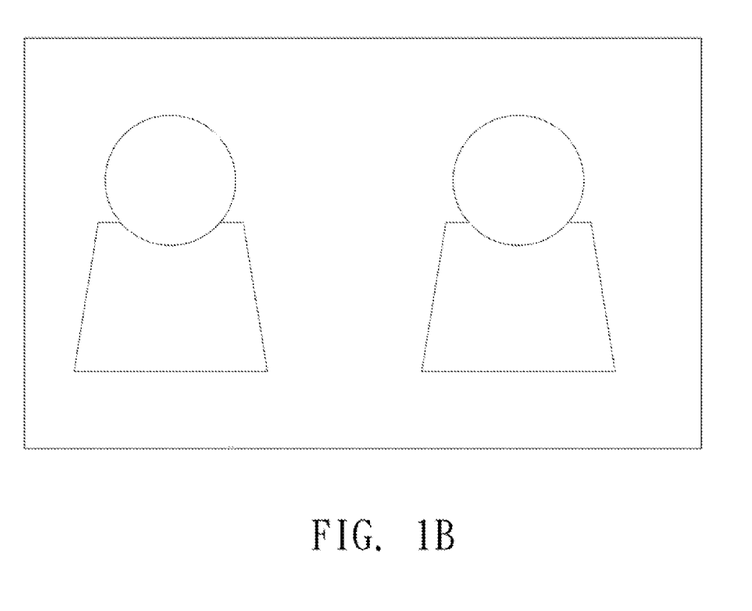
FIG. 1B is a schematic diagram illustrating an example of a composed image with scattered objects.

Conventionally, the respective images are continuously captured with a fixed time interval. If the time interval is too short or the moving speed of the object is too slow, the objects on the composed image may have a large overlapped portion, as shown in FIG. 1A. On the contrary, if the time interval is too long or the moving speed of the object is too slow, the objects may be scattered on the composed image, as shown in FIG. 1B, and the number of the objects on the composed image may be not enough, resulting in difficulties for presenting the dynamic effect.

BRIEF SUMMARY OF THE INVENTION

Methods and systems for determining frames and photo composition within multiple frames are provided are provided.

In an embodiment of a method for determining frames within multiple frames, a plurality of frames, which are respectively captured with a predefined time interval are obtained. At least one object within at least two of the frames is detected. A moving speed of the object is calculated according to the positions of the object in the respective frames and the predefined time interval, and candidate frames are selected from the frames according to the moving speed of the object.

An embodiment of a system for determining frames within multiple frames comprises a storage unit and a processing unit. The storage unit comprises a plurality of frames, which are respectively captured with a predefined time interval. The processing unit detects at least one object within at least two of the frames. The processing unit calculates a moving speed of the object according to the positions of the object in the respective frames and the predefined time interval, and selects candidate frames from the frames according to the moving speed of the object.

In an embodiment of a method for photo composition within multiple frames, a plurality of frames, which are respectively captured with a predefined time interval are obtained. At least one object within at least two of the frames is detected. A moving speed of the object is calculated according to the positions of the object in the respective frames and the predefined time interval, and candidate frames are selected from the frames according to the moving speed of the object. The candidate frames are composed to generate a composed photo.

An embodiment of a system for photo composition within multiple frames comprises a storage unit and a processing unit. The storage unit comprises a plurality of frames, which are respectively captured with a predefined time interval. The processing unit detects at least one object within at least two of the frames. The processing unit calculates a moving speed of the object according to the positions of the object in the respective frames and the predefined time interval, and selects candidate frames from the frames according to the moving speed of the object. The processing unit composes the candidate frames to generate a composed photo.

In some embodiments, a table is looked up according to the moving speed of the object to obtain a frame gap number, and the candidates frames are selected within the frames at intervals of the frame gap number. In some embodiments, the faster the moving speed is, the smaller the frame gap number is.

In an embodiment of a method for determining frames within multiple frames, a plurality of frames, which are respectively captured with a predefined time interval are obtained. At least one object within at least two of the frames is detected. An overlapped area corresponding to the object within a first frame and a second frame is calculated, and at least one candidate frame is selected according to the overlapped area corresponding to the object.

An embodiment of a system for determining frames within multiple frames comprises a storage unit and a processing unit. The storage unit comprises a plurality of frames, which are respectively captured with a predefined time interval. The processing unit detects at least one object within at least two of the frames. The processing unit calculates an overlapped area corresponding to the object within a first frame and a second frame, and selects at least one candidate frame according to the overlapped area corresponding to the object.

In an embodiment of a method for photo composition within multiple frames, a plurality of frames, which are respectively captured with a predefined time interval are obtained. At least one object within at least two of the frames is detected. An overlapped area corresponding to the object within a first frame and a second frame is calculated, and at least one candidate frame is selected according to the overlapped area corresponding to the object. The at least one candidate frame is composed to generate a composed photo.

An embodiment of a system for photo composition within multiple frames comprises a storage unit and a processing unit. The storage unit comprises a plurality of frames, which are respectively captured with a predefined time interval. The processing unit detects at least one object within at least two of the frames. The processing unit calculates an overlapped area corresponding to the object within a first frame and a second frame, and selects at least one candidate frame according to the overlapped area corresponding to the object. The processing unit composes the at least one candidate frame to generate a composed photo.

In some embodiments, it is determined whether the overlapped area corresponding to the object is less than a specific percentage of a contour area of the object. If the overlapped area corresponding to the object is less than a specific percentage of the contour area of the object, the second frame is selected as the candidate frame.

In some embodiments, it is determined whether the overlapped area corresponding to the object equals to zero. If the overlapped area corresponding to the object equals to zero, a moving speed of the object is calculated according to the positions of the object in the respective frames and the predefined time interval, and candidate frames are selected within the frames according to the moving speed of the object.

Methods for determining frames and photo composition within multiple frames may take the form of a program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein.

DETAILED DESCRIPTION OF THE INVENTION

Methods and systems for determining frames and photo composition within multiple frames are provided.

Figure 2:
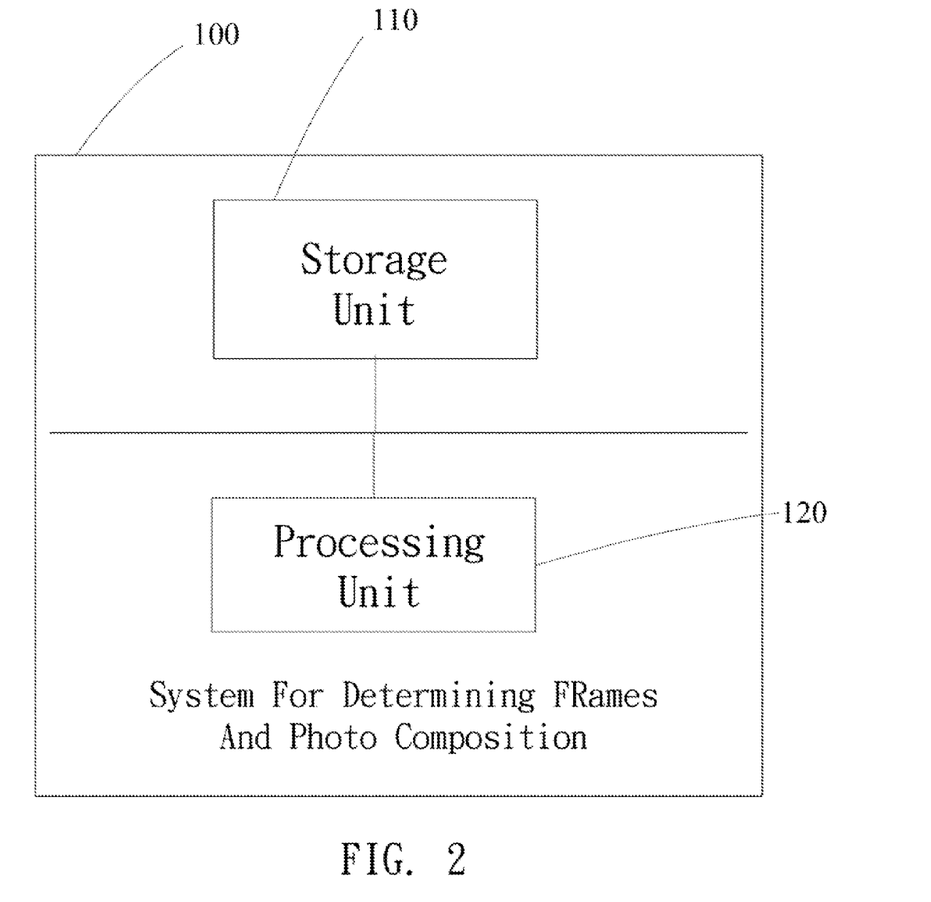
FIG. 2 is a schematic diagram illustrating an embodiment of a system for determining frames and photo composition within multiple frames of the invention.

FIG. 2 is a schematic diagram illustrating an embodiment of a system for determining frames and/or photo composition within multiple frames of the invention. The system for determining frames and/or photo composition within multiple frames 100 can be used in an electronic device, such as a computer, or a portable device, such as a digital camera, a handheld device such as a mobile phone, a smart phone, a PDA (Personal Digital Assistant), a GPS (Global Positioning System), or any picture-taking device.

The system for determining frames and/or photo composition within multiple frames 100 comprises a storage unit 110 and a processing unit 120. The storage unit 110 comprises a plurality of frames, which are respectively captured with a time interval. It is understood that, in some embodiments, a time interval would be predefined or dynamically defined. It is understood that, in some embodiments, the frames can be obtained from a video. It is understood that, in some embodiments, the system for determining frames and/or photo composition within multiple frames 100 can also comprise an image capture unit (not shown in FIG. 2). The image capture unit may be a CCD (Charge Coupled Device) or a CMOS (Complementary Metal-Oxide Semiconductor), placed at the imaging position for objects inside the electronic device. The image capture unit can continuously capture the frames within a predefined time interval. It is also understood that, in some embodiments, the system for determining frames and/or photo composition within multiple frames 100 can also comprise a display unit not shown in FIG. 2). The display unit can display related figures and interfaces, and related data, such as the image frames continuously captured by the image capture unit. It is understood that, in some embodiments, the display unit may be a screen integrated with a touch-sensitive device (not shown). The touch-sensitive device has a touch-sensitive surface comprising sensors in at least one dimension to detect contact and movement of an input tool, such as a stylus or finger on the touch-sensitive surface. That is, users can directly input related data via the display unit. The processing unit 120 can control related components of the system for determining frames and/or photo composition within multiple frames 100, process the image frames, and perform the methods for determining frames and/or photo composition within multiple frames, which will be discussed further in the following paragraphs. It is noted that, in some embodiments, the system for determining frames and/or photo composition within multiple frames 100 can further comprise a focus unit (not shown in FIG. 2). The processing unit 120 can control the focus unit to perform a focus process for at least one object during the photography process.

Figure 3:
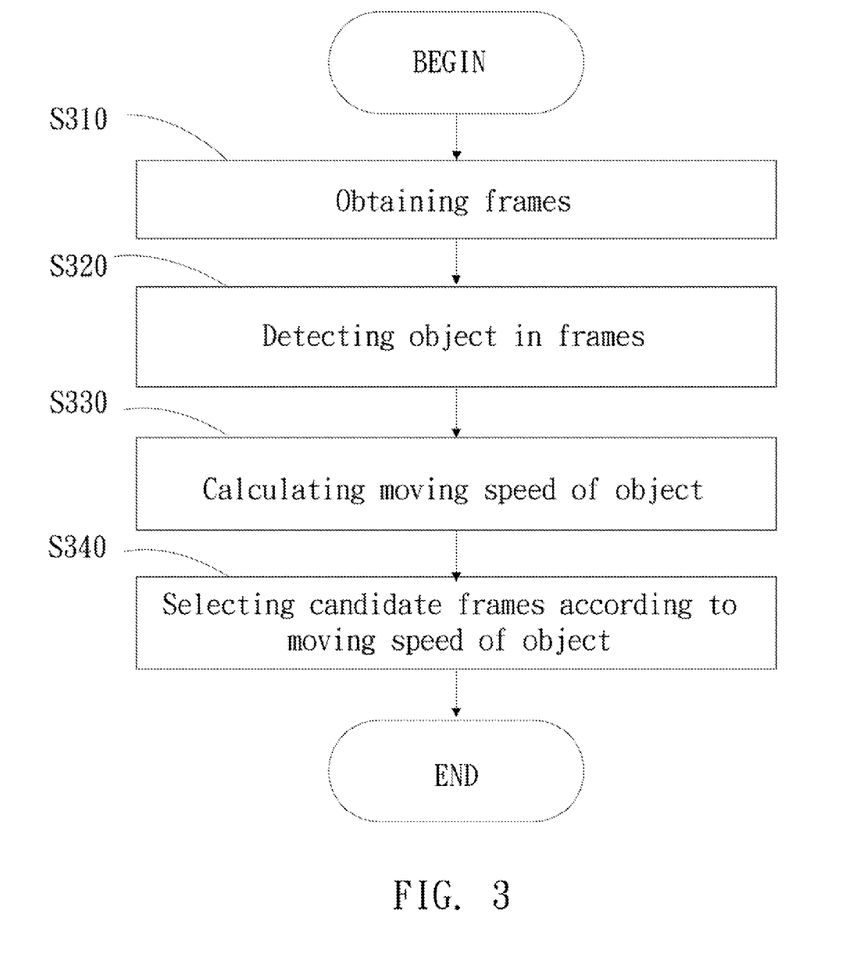
FIG. 3 is a flowchart of an embodiment of a method for determining frames within multiple frames of the invention.

FIG. 3 is a flowchart of an embodiment of a method for determining frames within multiple frames of the invention. The method for determining frames within multiple frames can be used in an electronic device, such as a computer, or a portable device, such as a digital camera, a handheld device such as a mobile phone, a smart phone, a PDA, a GPS, or any picture-taking device. In the embodiment, candidate frames for photo composition can be determined.

In step S310, a plurality of frames are obtained. It is understood that, in some embodiments, the frames are continuously and respectively captured within a predefined time interval. In some embodiments, the frames can be obtained from a video. In step S320, at least one object within at least two of the frames, such as the first two successive frames is detected. It is understood that, in some embodiments, the object can be obtained by transforming the at least two frames into grayscale frames, and subtracting the grayscale frames with each other to obtain a contour of the object. In step S330, a moving speed of the object is calculated according to the positions of the object in the respective frames and the predefined time interval. It is understood that, in some embodiments, once the contour of the object is detected, the area of the contour is calculated based on the contour of the object, the position of mass center of the area is calculated based on the area of the contour, and the moving speed of the object can be also calculated based on the position of mass center of the area. In step S340, candidate frames are selected from the frames according to the moving speed of the object. It is understood that, in some embodiments, a table can be looked up according to the moving speed of the object to obtain a frame gap number, and the candidates frames can be selected within the frames at intervals of the frame gap number. In the table, the faster the moving speed is, the smaller the frame gap number is. It is noted that, the actual value of the frame gap number can be flexibly designed according different applications and requirements. The selected candidate frames can be used for photo composition.

Figure 4:
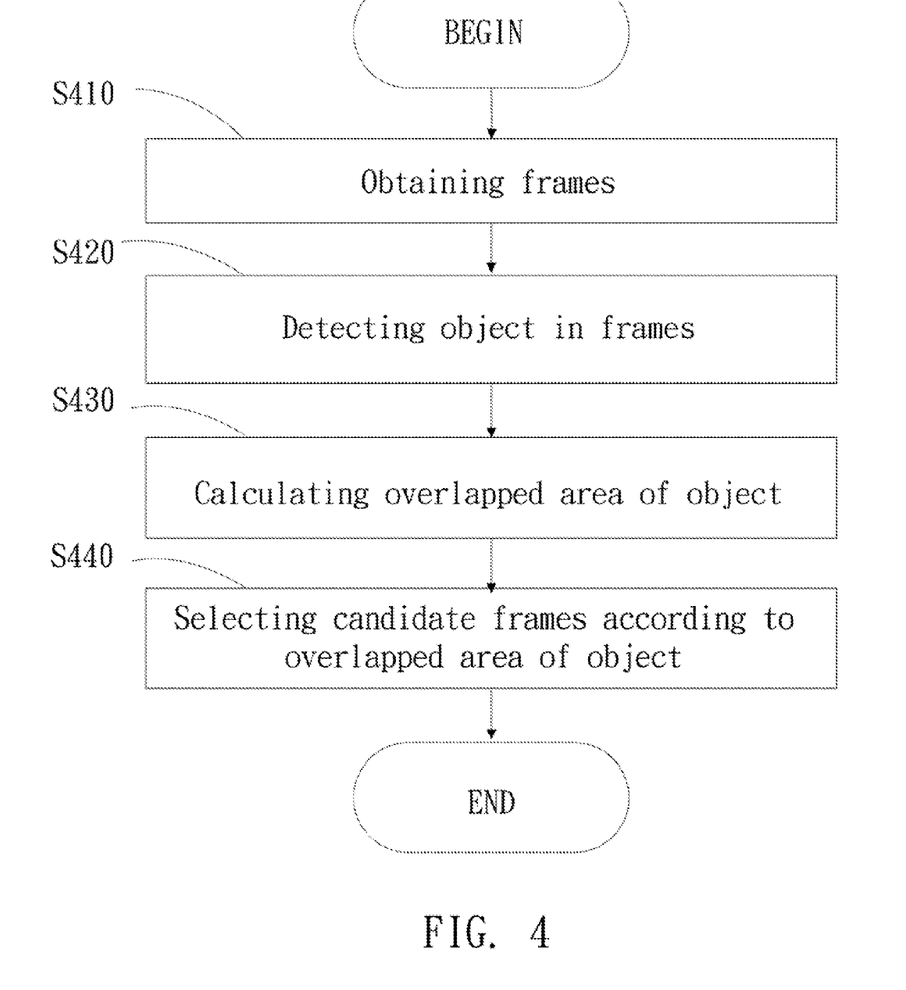
FIG. 4 is a flowchart of another embodiment of a method for determining frames within multiple frames of the invention.

FIG. 4 is a flowchart of another embodiment of a method for determining frames within multiple frames of the invention. The method for determining frames within multiple frames can be used in an electronic device, such as a computer, or a portable device, such as a digital camera, a handheld device such as a mobile phone, a smart phone, a PDA, a GPS, or any picture-taking device. In the embodiment, candidate frames for photo composition can be determined.

In step S410, a plurality of frames are obtained. It is understood that, in some embodiments, the frames are continuously and respectively captured with a predefined time interval. In some embodiments, the frames can be obtained from a video. In step S420, at least one object within at least two of the frames, such as the first two successive frames is detected. It is understood that, in some embodiments, the object can be obtained by transforming the at least two frames into grayscale frames, and subtracting the grayscale frames with each other to obtain a contour of the object. In step S430, an overlapped area corresponding to the object within two frames, such as a first frame and a second frame is calculated. It is understood that, in some embodiments, once the contour of the object is detected, the area and the position of the contour of the object can be calculated, and the overlapped area can be accordingly calculated. In step S440, at least one candidate frame is selected according to the overlapped area corresponding to the object. The selected candidate frames can be used for photo composition.

Figure 5:
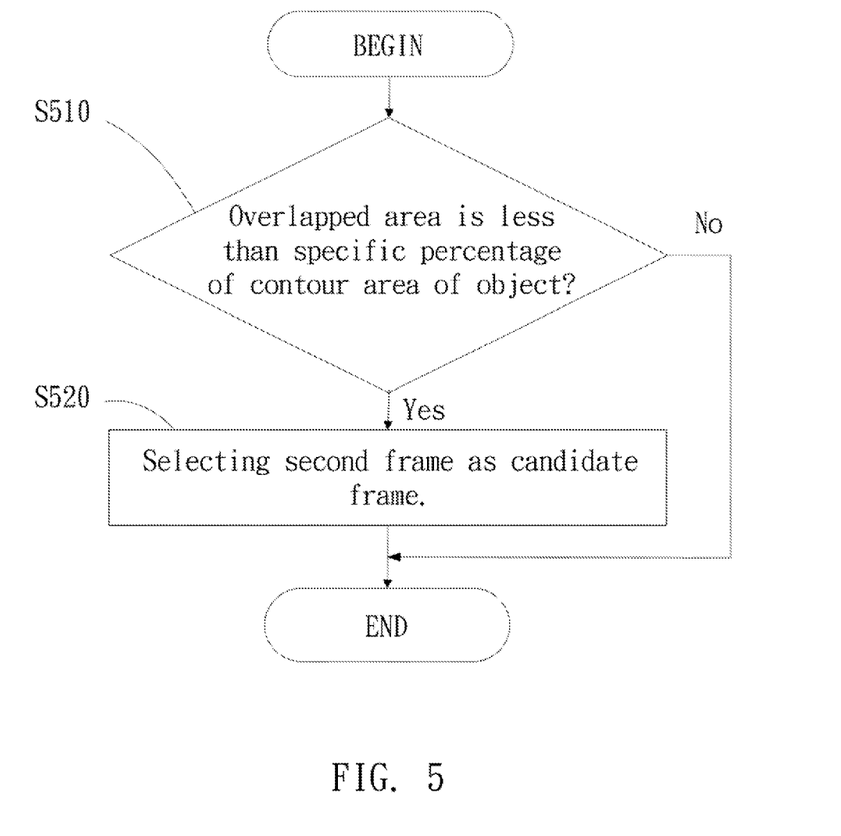
FIG. 5 is a flowchart of an embodiment of a method for selecting at least one candidate frame according to the overlapped area corresponding to the object of the invention.

FIG. 5 is a flowchart of an embodiment of a method for selecting at least one candidate frame according to the overlapped area corresponding to the object of the invention. In step S510, it is determined whether the overlapped area corresponding to the object within two frames, such as a first frame and a second frame is less than a specific percentage of a contour area of the object. If the overlapped area corresponding to the object is less than a specific percentage of the contour area of the object (Yes in step S510), in step S520, the rear frame, such as the second frame is selected as the candidate frame. If the overlapped area corresponding to the object is not less than a specific percentage of the contour area of the object (No in step S510), the procedure is completed. It is understood that, thereafter, an overlapped area corresponding to the object within the first frame and a subsequent frame, such as a third frame (wherein the second frame is not selected as a candidate frame) can be calculated, and accordingly determined. Alternatively, an overlapped area corresponding to the object within the second frame and a subsequent frame, such as a third frame (wherein the second frame is selected as a candidate frame) can be calculated, and accordingly determined. The process is repeated until all frames are examined.

Figure 6:
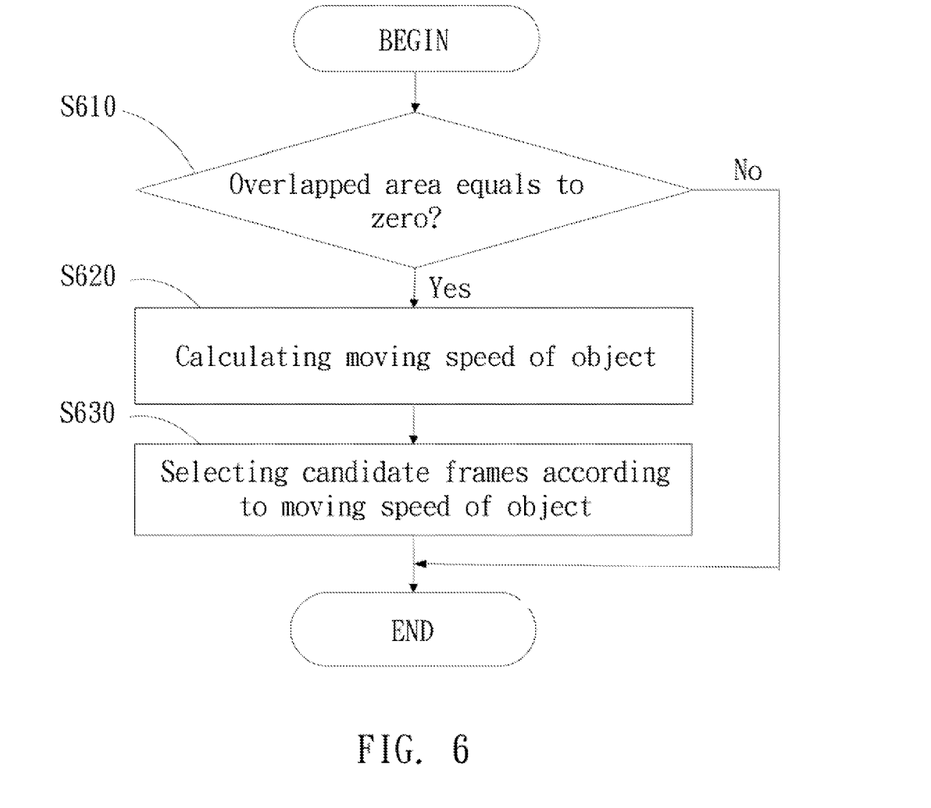
FIG. 6 is a flowchart of another embodiment of a method for selecting at least one candidate frame according to the overlapped, area corresponding to the object of the invention.

FIG. 6 is a flowchart of another embodiment of a method for selecting at least one candidate frame according to the overlapped area corresponding to the object of the invention. In step S610, it is determined whether the overlapped area corresponding to the object within two frames, such as a first frame and a second frame equals to zero. If the overlapped area corresponding to the object equals to zero (Yes in step S610), in step S620, a moving speed of the object is calculated according to the positions of the object in the two frames and the predefined time interval. It is understood that, in some embodiments, once the contour of the object is detected, the area of the contour, the position of mass center of the area, and the moving speed of the object can be also calculated. In step S630, candidate frames are selected within the frames according to the moving speed of the object. It is understood that, in some embodiments, a table can be looked up according to the moving speed of the object to obtain a frame gap number, and the candidates frames can be selected within the frames at intervals of the frame gap number. In the table, the faster the moving speed is, the smaller the frame gap number is. It is noted that, the actual value of the frame gap number can be flexibly designed according different applications and requirements. The selected candidate frames can be used for photo composition. If the overlapped, area corresponding to the object does not equal to zero (No in step S610), the procedure is completed. It is understood that, thereafter, an overlapped area corresponding to the object within the first frame and a subsequent frame, such as a third frame (wherein the overlapped area corresponding to the object does not equal to zero) can be calculated, and accordingly determined. The process is repeated until all frames are examined.

Figure 7:
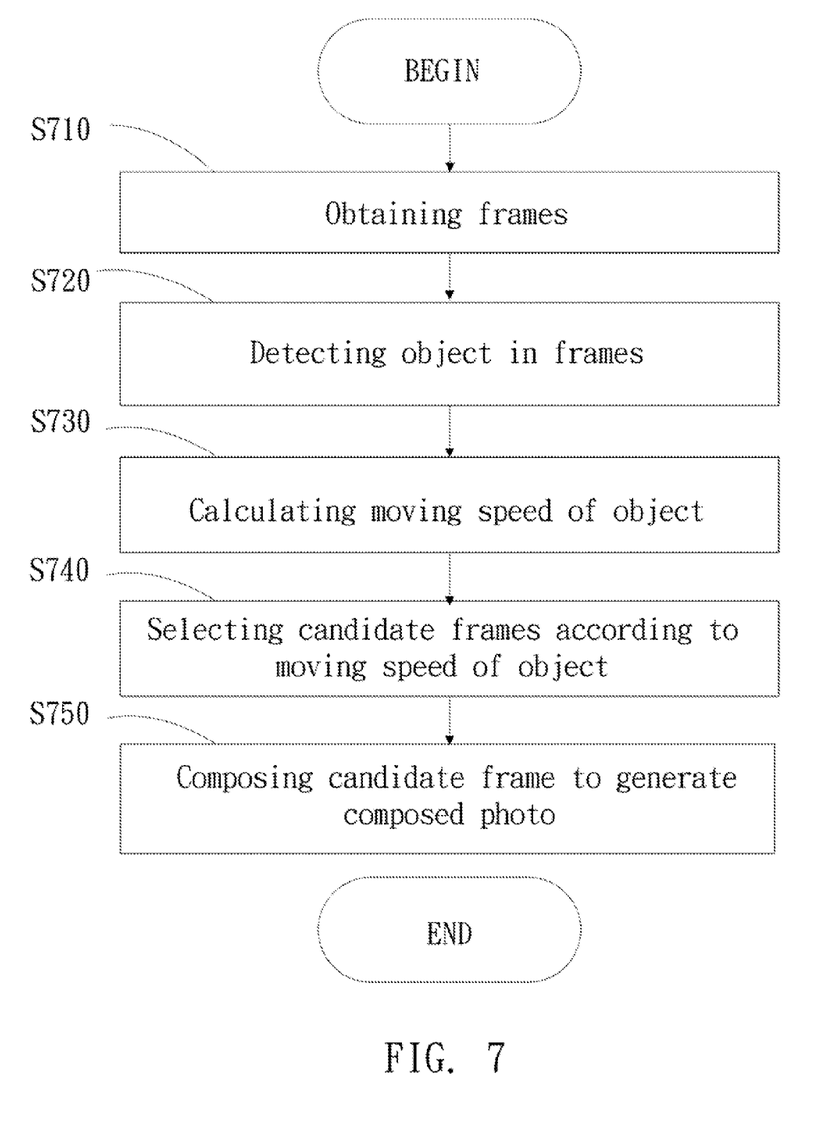
FIG. 7 is a flowchart of an embodiment of a method for photo composition within multiple frames of the invention.

FIG. 7 is a flowchart of an embodiment of a method for photo composition within multiple frames of the invention. The method for photo composition within multiple frames can be used in an electronic device, such as a computer, or a portable device, such as a digital camera, a handheld device such as a mobile phone, a smart phone, a PDA, a GPS, or any picture-taking device. In the embodiment, candidate frames can be selected from frames and used for photo composition.

In step S710, a plurality of frames are obtained. It is understood that, in some embodiments, the frames are continuously and respectively captured with a predefined time interval. In some embodiments, the frames can be obtained from a video. In step S720, at least one object within at least two of the frames, such as the first two successive frames is detected. It is understood that, in some embodiments, the object can be obtained by transforming the at least two frames into grayscale frames, and subtracting the grayscale frames with each other to obtain a contour of the object. In step S730, a moving speed of the object is calculated according to the positions of the object in the respective frames and the predefined time interval. It is understood that, in some embodiments, once the contour of the object is detected, the area of the contour, the position of mass center of the area, and the moving speed of the object can be also calculated. In step S740, candidate frames are selected from the frames according to the moving speed of the object. It is understood that, in some embodiments, a table can be looked up according to the moving speed of the object to obtain a frame gap number, and the candidates frames can be selected within the frames at intervals of the frame gap number. In the table, the faster the moving speed is, the smaller the frame gap number is. It is noted that, the actual value of the frame gap number can be flexibly designed according different applications and requirements. In step S750, the selected candidate frames are composed to generate a composed photo. It is understood that, the composition of candidate, frames can be performed by using an image composition algorithm. It is understood that, the image composition algorithm may be various and known in the art, and related descriptions are omitted here.

Figure 8:
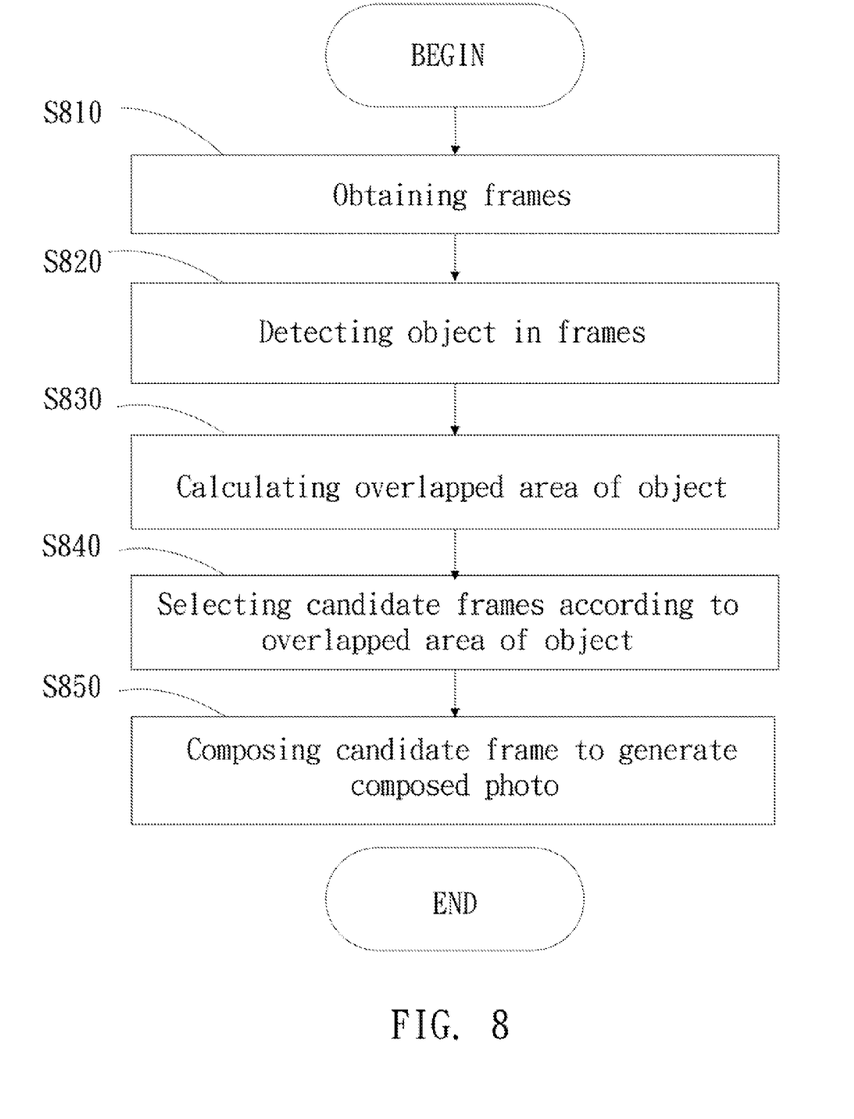
FIG. 8 is a flowchart of another embodiment of a method for photo composition within multiple frames of the invention.

FIG. 8 is a flowchart of another embodiment of a method for photo composition within multiple frames of the invention. The method for photo composition can be used in an electronic device, such as a computer, or a portable device, such as a digital camera, a handheld device such as a mobile phone, a smart phone, a PDA, a GPS, or any picture-taking device. In the embodiment, candidate frames can be selected from frames and used for photo composition.

In step S810, a plurality of frames are obtained. It is understood that, in some embodiments, the frames are continuously and respectively captured with a predefined time interval. In some embodiments, the frames can be obtained from a video. In step S820, at least one object within at least two of the frames, such as the first two successive frames is detected. It is understood that, in some embodiments, the object can be obtained by transforming the at least two frames into grayscale frames, and subtracting the grayscale frames with each other to obtain a contour of the object. In step S830, an overlapped area corresponding to the object within two frames, such as a first frame and a second frame is calculated. It is understood that, in some embodiments, once the contour of the object is detected, the area and the position of the contour of the object can be calculated, and the overlapped area can be accordingly calculated. In step S840, at least one candidate frame is selected according to the overlapped area corresponding to the object. It is understood that, in some embodiments, it is determined whether the overlapped area corresponding to the object is less than a specific percentage of a contour area of the object. If the overlapped area corresponding to the object is less than a specific percentage of the contour area of the object, the second frame is selected as the candidate frame. In some embodiments, it is determined whether the overlapped area corresponding to the object equals to zero. If the overlapped area corresponding to the object equals to zero, a moving speed of the object is calculated according to the positions of the object in the respective frames and the predefined time interval, and candidate frames are selected within the frames according to the moving speed of the object. After all frames are examined, in step S850, the selected candidate frames are composed to generate a composed photo. It is understood that, the composition of candidate frames can be performed by using an image composition algorithm. It is understood that, the image composition algorithm may be various and known in the art, and related descriptions are omitted here.

Therefore, the methods and systems for determining frames and photo composition within multiple frames of the present invention can select appropriate frames from continuously captured frames according to the moving speed of the object, and/or the overlapped area corresponding to the object with frames, and accordingly generate a composed frame, thus improving the dynamic effect of the track of the moving object.

Methods for determining frames and photo composition within multiple frames, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalent.

What is claimed is:

1. A method for determining frames within multiple frames for use in an electronic device, comprising:
   obtaining a plurality of frames, wherein the respective frames are captured with a time interval;
   detecting at least one object within at least two of the frames;
   calculating an overlapped area corresponding to the object within a first frame and a second frame; and
   selecting at least one candidate frame according to the overlapped area corresponding to the object, comprising the steps of:
      determining whether the overlapped area corresponding to the object equals to zero;
      if the overlapped area corresponding to the object equals to zero, calculating a moving speed of the object according to the positions of the object in the respective frames and the predefined time interval; and
      selecting candidate frames within the frames according to the moving speed of the object.

2. The method of claim 1, wherein the step of selecting at least one candidate frame according to the overlapped area corresponding to the object comprises the steps of:
   determining whether the overlapped area corresponding to the object is less than a specific percentage of a contour area of the object; and
   if the overlapped area corresponding to the object is less than a specific percentage of the contour area of the object, selecting the second frame as the candidate frame.

3. The method of claim 1, wherein the step of detecting at least one object within at least two of the frames comprises the steps of:
   transforming the at least two frames into grayscale frames; and
   subtracting the grayscale frames with each other to obtain a contour of the object.

4. The method of claim 1, wherein the step of selecting candidate frames within the frames according to the moving speed of the object comprises the steps of:

looking up a table according to the moving speed of the object to obtain a frame gap number; and selecting the candidates frames within the frames at intervals of the frame gap number.

5. The method of claim 4, wherein the faster the moving speed is, the smaller the frame gap number is.

6. The method of claim 1, further comprising recording a video, and the frames are obtained from the video.

7. A system for determining frames within multiple frames for use in an electronic device, comprising:

a storage unit configured to comprise a plurality of frames, wherein the respective frames are captured with a predefined time interval; and a processor configured to detect at least one object within at least two of the frames, calculate an overlapped area corresponding to the object within a first frame and a second frame, and select at least one candidate frame according to the overlapped area corresponding to the object;

wherein the processor configured to select at least one candidate frame according to the overlapped area corresponding to the object comprises:

the processor configured to determine whether the overlapped area corresponding to the object equals to zero;

if the overlapped area corresponding to the object equals to zero, the processor configured to calculate a moving speed of the object according to the positions of the object in the respective frames and the predefined time interval; and the processor configured to select candidate frames within the frames according to the moving speed of the object.

* * * * *